United States Patent [19]
Hörl et al.

[11] Patent Number: 5,556,708
[45] Date of Patent: Sep. 17, 1996

[54] PROCESS FOR GRAFTING OF NITROGEN CONTAINING POLYMERS AND POLYMERS OBTAINED THEREBY

[75] Inventors: Hans-Heinrich Hörl, Bovenden; Dietmar Nussbaumer; Eberhard Wünn, both of Göttingen, all of Germany

[73] Assignee: Sartorius AG, Gottingen, Germany

[21] Appl. No.: 269,999

[22] Filed: Jul. 1, 1994

Related U.S. Application Data

[63] Continuation of Ser. No. 829,022, filed as PCT/EP90/01500, Sep. 6, 1990, published as WO91/03506, Mar. 21, 1991, abandoned.

[30] Foreign Application Priority Data

Sep. 6, 1989 [DE] Germany .......................... 39 29 647.4

[51] Int. Cl.⁶ ................................................... B32B 27/00
[52] U.S. Cl. ..................................... 428/424.2; 428/475.8; 428/514; 428/515; 8/115.62; 427/331; 427/372.2; 427/385.5; 427/394
[58] Field of Search ................................. 428/475.8, 424.2, 428/514, 515; 8/115.62; 427/331, 372.2, 385.5, 394

[56] References Cited

U.S. PATENT DOCUMENTS 4,968,532  11/1990  Janssen et al. ........................... 427/164

FOREIGN PATENT DOCUMENTS 0052156  5/1982  European Pat. Off. .

OTHER PUBLICATIONS

Mishra et al., J. of Applied Polymer Science, vol. 26, pp. 2593–2600, Aug. 1981.

Primary Examiner—Stevan A. Resan
Attorney, Agent, or Firm—Chernoff, Vilhauer McClung & Stenzel

[57] ABSTRACT

There is disclosed a method for grafting unsaturated monomers to nitrogen-containing polymers in an aqueous environment and in the presence of carbon tetrachloride and certain reducing agents.

17 Claims, 3 Drawing Sheets

PROCESS FOR GRAFTING OF NITROGEN CONTAINING POLYMERS AND POLYMERS OBTAINED THEREBY

This application is a continuation of application Ser. No. 07/829,022, filed as PCT/EP90/01500, Sep. 6, 1990, published as WO91/03506, Mar. 21, 1991, now abandoned.

The invention relates to a process for the grafting of nitrogen-containing polymers, to whose nitrogen atoms substitutable hydrogen atoms are linked, with ethylenically unsaturated monomers as well as to the graft copolymerizates obtained in this process.

BACKGROUND OF THE INVENTION

According to a widespread grafting process, radical groups are introduced into the chain of the base polymer, e.g. by means of high-energy radiation, on which radical groups the grafting can take place by means of radical chain polymerization.

The generation of the activated, e.g. radical groups which effect the starting point of the grafting takes place in these grafting processes in an untargeted fashion, that is, the grafting does not take place exclusively at a certain grouping of the chain of the base polymer, such as e.g. on the nitrogen atom, but rather on all positions of the polymer chain which can be activated by means of high-energy radiation, e.g. also on methylene groups. A more or less strong degradation of polymer chains takes place at the same time by means of high-energy radiation and a damaging of the mechanical strength of the base polymer occurs as a consequence of the lowering of the degree of polymerization occasioned therewith. Likewise undesired side reactions in radiation-induced grafting are cross-linking reactions, which result in an embrittlement of the material.

Other processes of graft copolymerization are based on activation under radical formation by means of strong oxidizing agents such as e.g. $Ce^{IV}$ salts. This process can only be used in the case of very low pH'es, namely below pH=2, because otherwise a hydrolytic precipitation of the $Ce^{IV}$ salt occurs. The use of this process in the case of the polymers intended for the process of the invention results in a hydrolytic damaging of these polymers and a diminution of the mechanical strength due to a reduction in the degree of polymerization can also be observed. In addition, no purposeful grafting for increasing the chemical resistance of the base polymer is even possible according to this process.

Other processes for graft polymerization are based on chain transfer in that a homopolymerization of the monomer is induced by a radical initiator in the presence of the base polymer to be grafted, for which high temperatures must generally be employed (70°–80° C.). The grafting takes place in this instance by means of interaction of the growing polymer radical with the base polymer. The grafting site can also not be influenced in a purposeful manner in this instance. A further disadvantage of this grafting process resides in the fact that only a slight portion of the monomer used is consumed for the grafting whereas at the same time a considerable amount of homopolymer is produced. The formation of homopolymer is undesired because this increases the amount of the required monomer, which adversely affects the economy of the process and, moreover, a specific method step for removing the homopolymer becomes necessary.

The previously named grafting processes have the fact in common that the grafting does not take place at any sharply defined position of the base polymer, especially not with preference on the nitrogen atom. The chemical nature of the corresponding bonds such as the peptide group and the carbamic acid group is therefore not changed and a positive influence on the chemical stability of these bonds can therefore not take place.

It is also known that polyamides can be grafted with acrylamide or acrylonitrile in such a manner that in a first method step the hydrogen atoms on the nitrogen atoms are replaced by chlorine atoms. The halogen-substituted polyamides are then converted back into the initial polymer by means of hydrazine or iron-II-salts, during which time a radical transitional state of nitrogen appears. A radical chain polymerization on the nitrogen takes place in the presence of the named monomers as well as in the case of other redox-initiated polymerization processes. This reaction is described e.g. by K. V. Phung and R. C. Schulz in "Makromolekulare Chemie", 180, 1825 (1979). It was used in this paper to demonstrate the mentioned radical transitional state during the reduction.

Another paper which concerns grafting onto N-halogenated polyamides describes the initiation by means of metal carbonyls (C. H. Bamford, F. C. Duncan, R. J. W. Reynolds in "J. Poly. Sci." part C, pp. 419–432 (1968). These known processes are relatively expensive.

The present invention therefore has the object of creating a process for grafting nitrogen-containing polymers which is very simple to carry out and with whose aid it is possible to graft nitrogen-containing polymers in a uniform or purposeful fashion on the surface of form bodies in order to modify the properties of these nitrogen-containing initial materials in a desired manner.

The changes of the surface properties consist both in the increasing of the chemical resistance of the surface area, which should occur in every case, as well as in the influencing of other chemical and/or physical surface properties, especially of the wetting- and adsorption behavior without the disadvantages which occur in traditional grafting processes becoming active. These disadvantages are, explicitly expressed: Chain degradation and cross-linking reactions on the base polymer and/or a high amount of homopolymerizate as well as an unintended and/or uncontrollable progression of the grafting deep into the surface.

The invention therefore has the further object of creating a process which makes it possible in the case of form bodies which are not very compact, especially microporous membranes with a surface/mass ratio in a range of up to 50 $m^2/g$, to carry out the grafting selectively over the entire polymer matrix or to limit it to the externally located chain areas of the base polymer.

To the extent that it is a object of the invention to create a process for increasing the chemical stability of the base polymer, especially in the surface area of form bodies, an increase of the resistance to chain degradation by means of oxidative and hydrolytic degradation as well as by radiation damage is to be understood thereunder. In particular, the problem of the process of the invention consists in converting the most labile groupings in the main chain of the base polymers such as the peptide- or carbamic acid group in the surface area into a form which is less susceptible to chemical attack in order to avoid a chain degradation of the base polymer. A stabilization of the surface layer should also protect the non-stabilized areas of the base polymer located thereunder from chemical attack. As a result thereof, it is not necessary to stabilize the entire base polymer of the form body, so that its mechanical properties are not altered in this area. An essential part of the problem definition is the fact that the above-named stabilization effects are achieved without the use of stabilizers which can be extracted with solvent.

A further object of the invention is a process for the production of composite bodies in which the form body used for grafting is provided on the surface with a layer of the graft polymer which is chemically connected to the form body and is essentially free of individual chains of the base polymer, so that the swelling properties of the layer of the graft polymer are exclusively determined by the type of the monomer used for the grafting and thus differ in a characteristic manner from those of the base polymer. In particular, graft polymers are to be understood thereunder which exhibit a high swelling capacity in aqueous media so that they are accessible, when they are provided with chemical groups which enable them to reversibly or irreversibly bond certain target substances, to these chemical groups for the particular target substances even in the interior of this layer. The target substances can be e.g. proteins, the groups capable of reversibly bonding can be ionic groups or affinity ligands, the groups capable of irreversibly bonding can be groups which can enter chemical bonds with amino- or sulfhydryl groups of proteins under mild conditions and are known in the state of the art. As a result of the fact that not only the surface but also the interior of the grafted polymer layer is accessible for the target substances, an especially high bonding capacity of the composite material should be achieved.

Whereas the areas of application for the above-named composite materials are in the area of the adsorptive separation of substances, a further object definition of the invention concerns the textile sector. The goal in the production of the composite bodies is here to provide formed bodies, especially textile fibers, with a grafted polymer layer which differs as regards the dyeing technology from the base polymer in the desired manner. An example for such an instance of application is present when the grafted-on polymer layer is to be dyed by means of a class of dyes for which the base polymer exhibits either no or only a slight affinity. This is especially desirable from the standpoint of textile technology when mixed fibers are to be dyed in one work step, e.g. mixed fibers of polyamides and cotton in a dye bath with reactive dyes for cellulose.

A further object of the invention is to create a process for the purposeful changing of the wetting properties of formed bodies, especially in the direction of an increase in the water wettability as well as the wettability by liquid with an even greater suface tension that that of water such as e.g. electrolytic solutions in high concentration. This goal is significant in all previously named areas of application. In addition to an increasing of the water wettability, there is also the problem of creating a process for the reduction of the adsorption capacity for lipophilic substances. In the case of microporous membranes primarily but not exclusively the protein adsorption should be reduced and in the case of textile fibers the contamination by fatty substances. In both cases a consequence of the reduction of the affinity for lipophilic substances is the fact that when such an adsorption has nevertheless taken place, it can be readily be undone again. In the case of textile fibers, this is expressed by the fact that washing can take place under considerably milder conditions than without such a modification of the surface. Likewise, filter membranes can be washed free again more easily after clogging by means of such a modification.

Another object of the invention is to make possible a process for the influencing of the zeta potential either in the direction of a negative or of a positive potential. The zeta potential also has considerable influence both in the case of filter materials and in the case of textiles on the properties of use as it determines the contamination properties in accordance with the contacting media. The electrostatic charge of the formed bodies is also closely associated with the zeta potential, which charge should also be reduced by the process of the invention in that the surface conductivity is increased by means of the introduction of ionic groups into the surface.

A further object of the invention consists in the case of form bodies which are not very compact and in the case of which the totality of the base polymer is located in a layer close to the surface in converting this form body entirely into a graft copolymer, during which an isotropic growth of this form body occurs with retention of its original form and the grafted form body differs in its chemical and optionally also mechanical properties and/or solubility properties in a desired manner from the initial product. In addition to a change in the chemical stability, these property changes can consist in an elevated as well as in a reduced solubility in certain solvents. As regards the mechanical properties, both an increase in the mechanical strength as well as an increase in flexibility can be achieved.

SUMMARY OF THE INVENTION

All of the foregoing objects are met by the process in accordance with the invention for grafting nitrogens-containing polymers, to whose nitrogen atoms substitutable hydrogen atoms are linked, with ethylenically unsaturated monomers in such a manner that the monomers are reacted with the polymers in the presence of a water-containing medium, carbon tetrachloride and of a reducing agent.

Depending on the reaction time, the grafting takes place either only on the surface of the initial polymer (in the case of short reaction times) or expands to an increasing extent in the direction of the interior of the initial polymer. If a uniformly grafted product is to be produced, it is advantageous to start with a pulverized or fibrous initial polymer in order to keep the necessary reaction times short.

The mechanism on which the process of the invention is based is different than that of the N halogenation described above and still cannot be explained at the present time. The grafting of ethylenically unsaturated monomers on cellulose, silk or nylon in the presence of water and carbon tetrachloride is known, but using elevated temperatures and long reaction times and not using a reducing agent, which must, however, absolutely be used for carrying out the process of the invention. In the absence of the reducing agent, no grafting at all takes place, even under the exclusion of oxygen, under the low temperatures preferred when using the process of the invention (0°–50° C., especially preferably in the vicinity of room temperature).

The process of the invention is advantageously carried out in water as reaction medium; however, media can also be considered which contain other components such as e.g. alcohols or ketones in addition to water, the monomer and carbon tetrachloride in order to broaden the solubility range of the monomer used. The limitation of the addition of organic solvents is given by the solubility of the reducing agent used, which decreases as the water content drops.

The solubility of carbon tetrachloride in water is approximately 0.08% by weight and is sufficient for carrying out the grafting.

DETAILED DESCRIPTION OF PREFERRED EMBODIMENTS

Type of Polymers

The process of the invention can be used on aliphatic polyamides such as nylon 4, nylon 6, nylon 6.6 and higher aliphatic polyamides as well as on aromatic polyamides which are known e.g. under the trade name of Nomex and Kevlar. The repeating structural unit of the peptide bond is common to the polymer class of polyamides:

—CO—NH—

The peptide bond can occur alone or also in combination with other repeating structural units such as e.g. in combination with the sulfone group:

—SO$_2$—

Polymers with peptide groups and sulfone groups are known as polysulfonamides and can be produced by means of the polycondensation of diaminodiarysulfones with aromatic dicarboyxlic acid.

Another group of polymers which can be grafted in accordance with the process of the invention are the polyurethane. The polyurethanes differ from the polyamides in that they exhibit the carbamic acid group

—O—CO—NH— instead of the peptide bond.

In distinction to the previously named polymers suitable for the process of the invention and containing nitrogen in the main chain, polymers containing the nitrogen in a side chain are also suitable. This can involve either primary or secondary amino groups:

—NH$_2$, —NHR but not tertiary amino groups. Likewise, the nitrogen-containing groups of the side chain can be primary or secondary amide groups:

—CO—NH$_2$, —CO—NHR

The polymers suitable for the application of the process of the invention have in common the fact that they have a hydrogen atom on the nitrogen which hydrogen atom can be substituted by a halogen atom, especially a chlorine or bromine atom. It cannot be explained in this case according to what mechanism the grafting occurs and what significance the halogen substitutability has. However, it has been determined that the same polymers are suitable for the process of the invention as are suitable for a process described in a parallel application which has the halogen substitution of nitrogen as the obligatory first step.

The polymers provided in the invention display a number of advantages which have resulted in their being widely used in industry. Thus, many representatives of polyamides are characterized by a high mechanical strength and a high softening point whereas the polyurethanes exhibit very advantageous elastic properties. In contrast thereto, these polymers exhibit certain disadvantages for practical application which can be traced in part to the limited stability of the peptide- and the carbamic acid group. A degradation of these groups, e.g. by means of hydrolytic, oxidative or radiation-chemical influences results in disadvantageous changes in the properties, as a result of which the area of application of these polymers is limited.

Type of Monomers

Simply or multiply ethylenically unsaturated monomers are suitable for the application of the invention to the extent that they exhibit a solubility, even if slight, in primarily aqueous systems. The term "primarily aqueous systems" denotes aqueous systems which contain, aside from the monomer, either no other organic component or a water-miscible solvent in a concentration which does not attain the quantity which results in a total precipitation of sodium dithionite. In the case of acetone as solvent, the amount can be e.g. up to 40% by weight.

Among the group of simply ethylenically unsaturated monomers, the unsaturated carboxylic acids such as acrylic and methacrylic acid as well as their esters and amides are suitable; methacrylic acid esters and methacrylic acid amides are especially preferred representatives. The esters which can be used are in particular: Methylmethacrylate, ethylmethacrylate, hydroxyethylmethacrylate, hydroxypropylmethacrylate, dihydroxypropylmethacrylate as well as the corresponding acrylates. Further among the methacrylates: Glycidylmethacrylate, trimethylammonium-2-hydroxypropylmethacrylate, dimethylaminoethylmethacrylate, diethylaminoethylmethacrylate, diethylene glycolmethacrylate, octaethylene glycolmethacrylate, sulfopropylmethacrylate, 2-N-morpholinoethylmethacrylate. Suitable monomers with an amide base are: Acrylamide, dimethylaminopropylmethacrylamide, methacrylamidopropyltrimethylammonium chloride, 2-acrylamido-2-methyl-propane sulfonic acid, N-acrylamidoglycol acid, N-morpholinopropylmethacrylamide, methacrylamidoglycolatemethyl ether, N-hydroxyethyl-methacrylamide, N-[tris(hydroxymethyl)]-methyl-methacrylamide. Further suitable, simply ethylenically unsaturated monomers are: Vinyl acetate, N-vinyl pyrrolidone, 4-vinyl pyridine, N-vinyl imidazol.

The named monomers can be used alone or in a mixture. In particular, it is possible to use simply and multiply ethylenically unsaturated monomers in combination, which achieves the grafting of a cross-linked polymer. However, multiply ethylenically unsaturated monomers can also be used alone.

Suitable multiply ethylenically unsaturated monomers are: Pentaerythritol dimethacrylate, glycerol dimethacrylate, tetraethyleneglycol dimethacrylate, tetraethyleneglycol diacrylate, methylene bisacrylamide.

Form of Application of the Polymers

The process of the invention is suitable for being used for grafting polymers before their final processing and also after their processing to form bodies. In the first instance the polymer can be present e.g. as a powder or a fine granular material.

The form bodies employed for the use of the process of the invention can be compact bodies, which also includes those bodies which exhibit a surface which is relatively small in relation to their mass. Examples for this are plates, pipes, hoses, vessels such as bottles and the like as well as also construction components such as gears. Less compact form bodies, which exhibit a relatively large surface in relation to their mass, are foils, fibers or capillaries. Fibers in a thickness range of 1–100 μm have e.g. a surface/mass ratio approximately in a range of 0.4 to 4 $m^2/g$. Fibrous form bodies can be processed further in the form of textile fibers to tissues and likewise to non-woven areal structures such as fleeces, which can be used e.g. for purposes of filtration.

The process of the invention is especially suitable for formed bodies which exhibit an extremely large ratio of surface to mass of the polymer such as e.g. for microporous membranes for particle- and sterile filtration whose base polymer frequently consists of polyamides or polysulfonamides. The surface/mass ratio can be in the case of such porous form bodies in a range between 5 and 50 $m^2/g$. The webs existing between the pores therefore exhibit only very slight wall thicknesses, with typical values being on the order of a few hundredths to a few tenths of a micron. Microporous membranes can be divided into ultra- and microfiltration membranes. The former are characterized by pore sizes which enable them to retain macromolecules approximately in a molar mass range between 500 and 1,000,0000 daltons whereas the latter exhibit effective pore sizes in a range between approximately 0.01 and 10 μm. Microporous membranes exhibit either a continuously microporous structure or a microporous base structure and a skin-like layer located on the surface which layer is designated in the technical jargon as "skin". As a consequence of the lack of microporse, this skin does not exhibit a convective but rather only a diffuse permeability for the transport of substances and is therefore suited for separations of substances on a molecular basis. Typical industrial separating methods which can be carried out with the last-named membranes comprising a skin are reverse osmosis, gas separation and pervaporation.

A further group of form bodies with high surface-mass ratio are foams as well as microporous, vapor-permeable materials, which latter can be used as replacement material for leather. Polymers preferred in industry for the production of such form bodies are the polyurethanes. Foams can be open-cell or closed-cell. In the first instance the invention provides for a grafting on the total, thus also on the inner surface of the foam and in the other instance only on the outer surface.

Graft Polymerization

The term "graft polymerization" denotes a polymerization in which a side chain is grafted onto a polymer chain of a uniform product, which side chain consists of one or several other monomers. The properties of the graft copolymerizate obtained such as e.g. solubility behavior, melting point, water absorption, wettability, mechanical properties, adsorption behavior, etc. deviate more or less sharply from those of the initial polymer as a function of the type and amount of the grafted monomers. The greater the amount ratio of the grafted polymer in relation to the base polymer, the more the properties of the former predominate.

In addition, the properties of the graft copolymerizate are influenced by the position at which the grafting takes place on the initial polymer.

Graft polymerization can be carried out both in liquid phase, that is, in a melt or solution, and in a solid phase, at which time the base polymer must generally be in a swollen form in order to make possible the access of the monomer to the chains of the base polymer. The swelling can take place either by means of the monomer itself or by means of a further component which does not participate itdelf in the polymerization. The grafting progresses in this instance from the surface to the interior of the polymer. The case can occur thereby that the graft copolymer being produced is soluble in the grafting medium, which accelerates the progress of the grafting because the diffusion paths are not lengthened during the grafting.

Surface Grafting of Form Bodies

The present invention can be used in an especially advantageous manner in the surface grafting of form bodies, especially of tissues, fleeces and membranes of nylon (cf. in this connection DE-OS 39 29 648.2-44). However, other formed parts can also be surface-modified, e.g. for modifying the wetting, sliding and adsorption properties in accordance with the process of the invention.

In a pure surface grafting only the parts of the chains of the base polymer located directly on the surface of the formed body are grafted, so that in those instances in which the graft copolymer being procuded was converted during complete grafting into a graft copolymer soluble in the grafting medium, the non-grafted part of the polymer chain remains in the polymer structure, so that no separating of the graft copolymer from the surface of the form body is possible. Therefore, those monomers can also be used in a pure surface grafting which would result in the case of complete grafting in soluble products. In the case of a matrix grafting of form bodies in which entire chains of the base polymer are grafted, the utility of the monomers is limited to those in the case of which even the graft copolymerizate being produced is insoluble. This can be achieved, if required, by means of a cross-linking grafting under the addition of a multiply ethylenically unsaturated monomer if the monomer provided for an application does not fulfil this precondition itself.

The matrix grafting of non-compact form bodies is then necessary if bulk properties such as e.g. elasticity or flexibility, the solubility properties or the resistance to gamma rays is to be altered. If, on the other hand, only the adsorption behavior and/or the wetting behavior are to be influenced and an alteration of the mechanical properties as well as of the solubility are to be avoided, it is on the other hand necessary to avoid a progression of the grafting deep into the polymer, the matrix grafting.

In the case of the matrix grafting of non-compact formed bodies, the result of the surface grafting is thus the same as that which would have been obtained if the particular formed body had been produced from the start from the graft copolymer. The advantage of subsequent grafting, in contrast thereto, resides in that fact that appropriate production methods are frequently known or possible for the base polymers whereas they are either unknown or cannot be carried out in principle for the graft copolymer. Thus, for example, suitable processes for producing microporous membranes from polyamides or polysulfonamides as well as for producing open-pore foams of polyurethane are known. However, these techniques cannot be applied straightaway to the corresponding graft copolymerizates. If the graft copolymerizates are products which are insoluble in common solvents, these processes cannot even be transferred in principle.

On the other hand, there are instances in which a pure surface grafting, that is, a sharp delimitation between the largely unchanged base polymer and the grafted-on polymer is of decisive significance for the intended application of the grafted form bodies. Such instances are especially present if the base polymer is to function as carrier for the polymer grafted on in a thick layer and if this grafted-on layer should be largely free of chains of the base polymer.

An important example for such an instance is present if a composite material is to be produced for adsorptive separations of substances such as e.g. ion exchange or affinity chromatography by means of surface grafting onto microporous membranes. It is not only important thereby in the interest of a high adsorption capacity that the entire inner and outer surface is coated by a layer of the grafted-on polymer but also that this layer exhibits a certain thickness because the entire layer thickness of the grafted-on polymer contributes to the adsorption capacity.

It is necessary in the case of such membranes for the adsorptive separation of substances that the substances to be adsorbed, e.g. proteins, can penetrate into the grafted-on polymer layer. Although it can not be rigorously proven, it is assumed that for this the grafted-on chains must be present in a state which can be completely solvated by the medium used and that chains of the base polymer which are occasionally present are detrimental to this goal.

The above explanation is based on the observation that given identical initial membranes, the same degree of grafting and affinity ligands introduced in the identical manner, considerably lower bonding capacities for the substance to be adsorbed are found if the grafting took place over the entire layer thickness than if the grafting was limited to the chain segments of the base polymer close to the surface.

A distinction between these two types of surface grafting, that is, between matrix grafting and pure surface grafting, is possible in the case of microporous membranes by means of a comparison of the flowthrough characteristic and of the outer dimensions before and after the grafting in as far as the membranes used for the grafting are not reinforced, that is, not provided with a fleece or tissue as reinforcement material. If a matrix grafting takes place in this instance, an isotropic growth of the membrane matrix occurs, that is, macroscopically viewed, both a surface growth and a thickness growth occur.

Since the pores also grow proportionally along with an isotropic growth of the membrane matrix, the number of pores per surface area drops thereby but their size increases, so that on the whole an increase of the hydraulic permeability can be observed. The opposite occurs in the case of a pure surface grafting, that is, when the grafting is limited to the chain segments of the base polymer close to the surface. Since the membrane matrix itself does not change its dimensions thereby but rather only an additional layer is grafted on, the outer dimensions also remain constant and the grafted-on layer results in a pore constriction so that the hydraulic permeability of the membrane decreases.

Although a distinction between these two limiting forms of surface grafting is also conceivable polychemically, the potential methods for this are relatively complicated and the above-named distinguishing criterion appears to suffce for the practical requirements of membrane modification. To be sure, it can be determined in a limiting fashion that the type of monomer used also has an influence thereby. If a monomer is involved whose homopolymer is soluble or sharply swellable in the medium used for the mentioned permeability measurements, then a decrease of permeability can be observed in every case, thus also in matrix grafting. It turned out in practice that during the grafting of hydroxyethylmethacrylate a graft polymer is produced which is sufficiently poorly swellable in water to make it possible to use the above distinguishing criteria with water as medium for determining the hydraulic permeability.

The above explanations are not to be misunderstood in the sense that an increase or decrease in permeability must necessarily be measurable in the case of the two limited forms of surface grafting. This merely involves qualitative distinguishing criteria between the two border forms of surface grafting which are only measurable in the case of correspondingly high degrees of grafting and are moreover dependent on the pore size of the initial membranes. Thus, the lowering of the hydraulic permeability at the same degree of grafting is all the greater the lower the pore size of the initial membrane is. It can be indicated as guiding principle that the named distinguishing criteria become measurable in the case of membranes with a nominal pore size of 0.2 µm at degrees of grafting of above 10% by weight.

Either a high or a low degree of grafting can be striven for both in matrix grafting and also in a pure surface grafting. Since the above distinguishing criteria can not be used in the case of low degrees of grafting, it has proven to be advantageous in these instances when working out the grafting conditions to work up the basic conditions at first at high degrees of grafting in order to assure the utility of the named distinguishing criteria and to subsequently adjust the desired degree of grafting under conditions which are otherwise the same at lower monomer concentration. A non-aqueous medium can also be used therey if the monomer provided for the grafting results in products which are strongly water-swellable, so that the hydraulic permeability for water decreases in every case.

On the other hand, in those instances in which a relatively thick layer of graft polymer is necessary for the application of the product to be produced by grafting, as e.g. in the case of the production of membranes for the adsorptive separation of substances, a reduction of the hydraulic permeability is unavoidable, so that in order to assure a certain minimum degree of hydraulic permeability of the final product, a correspondingly coarse-pore initial membrane must be the starting point. The relation of initial porosity, degree of grafting, permeability and bonding capacity of the final product can be varied for optimization in the manner customary with experts in the art.

It must also be considered hereby that as the pore size increases, the inner surface of a microporous membrane increases, particularly sharply in the range up to a nominal pore size of 0.2 µm. If the protein adsorption of the non-modified membrane is taken as a measure of the inner surface, then the relative inner surface at 0.2 µm is only 0.75, with the inner surface of a 0.1 µm membrane set equal to 1. It drops at 0.45 µm to only 0.65, at 0.8 µm to 0.5 and is still 0.43 at 3.0 µm. Since the thickness of the grafted-on layer results by calculation from the grafted-on mass divided by the surface, given the identical degree of grafting, the layer thickness is thus considerably greater in the case of a coarse initial membrane than in the case of a finer initial membrane. However, in the interest of short diffusion paths in order to achieve favorable adsorption and desorption kinetics, short diffusion paths are generally to be preferred in membranes for adsorptive separations of substances. In other words, in addition to the magnitudes of bonding capacity and hydraulic permeability, the kinetic parameters must also be included in the optimization instructions sketched above for the grafting of membranes for the adsorptive separation of substances.

A general instruction for the production of optimum such products can not be given because this optimum can differ greatly, depending on the application. If the target substance is to extracted from a very great volume of a very dilute solution, high hydraulic permeabilities in conjunction with a high adsorption speed are necessary. It is advantageous in this instance to select a fine-pore initial membrane in conjunction with a low degree of grafting. If, on the other hand, the target substance is present in a relatively high concentration, the bonding capacity becomes more significant in relation to the kinetic viewpoints and more coarse-pore membranes with a high degree of grafting are to be preferred.

If only an influencing of the zeta potential or of the wettability or a reduction of the non-specific adsorption is to be achieved by the surface grafting, that is, only the surface of the graft polymer but not its volume becomes active, a pure surface grafting in conjunction with the minimum degree of grafting necessary for a complete surface coating should be striven for.

The Reducing Agents

The preferred reducing agent for the application of the process of the invention is sodium dithionite as well as its daughter products such as e.g. rongalite. Other reducing agents such as hydrazine or ascorbic acid, the latter in the alkaline range, can also be used but are less preferred.

A reducing agent system which is suitable in accordance with the invention is described in the literature in conjunction with redox-initiated polymerizations (R. W. Brown, C. V. Bawn, E. B. Hansen, L. H. Howland in "Ind. Eng. Chem." 46, pp. 1073–1080 (1954) and consists of a combination of EDTA-complexed $Fe^{2+}$ with rongalite at approximately pH 10. Rongalite itself is largely ineffective at room temperature for the process of the invention but is effective at temperatures from 40°–50° C., at which it develops a sufficient redox potential. Rongalite, which is produced industrially as dithionite with formaldehyde, appears to be effective like dithionite itself in a quite similar manner and the addition of complexing Fe ions as well as the elevation of temperature essentially appears to bring about the release of dithionite.

In contrast to the grafting processes on N-halogen polyamides mentioned further above, the grafting speed decreases according to the process of the invention in a certain range with increasing, that is, more negative redox potential. Thus, in the grafting of hydroxymethylmethacrylate on nylon membranes at −340 mV the degree of grafting, given the same time of grafting, is more than one magnitude above that at −440 mV if sodium dithionite is used as reducing agent at a pH of 8.

A pH range of 6–10 is preferred for carrying out the process of the invention using sodium dithionite as reducing agent, with the especially preferred range being between 7.5 and 8.5, namely approximately 8. The concentration of the sodium dithionite can be between 0.02 and 1%. If a grafting bath is used thereby for a fairly long time, the redox potential can be determined potentiometrically during the grafting and maintained constant by dosing in a sodium dithionite concentrate. Typical values for a suitable redox potential are between −100 and −500 mV, especially between −100 and −300mV, particularly between −200 and −300 mV. The precise conditions under which the reagents are added can not be determined as regards their range but can be ascertained by means of simple optimizing tests.

Cause of the Increased Chemical Resistance

In those instances in which the nitrogen atom is located in the main chain of the base polymer, as in the polyamides and polyurethanes, an oxidative splitting of the peptide- or carbamic acid group occurs upon the action of atmospheric oxygen under heat which splitting brings about a diminution of the chain length and therewith a degradation of the polymer. This reaction is accompanied by a loss of mechanical strength as well as an embrittlement. In addition, a brown discoloration can occur, which is undesirable for many applications. In the same manner, a chein degradation also takes place in the case of a hydrolytic attack as well as upon the action of electromagnetic radiation, especially of UV and gamma radiation.

The use of the process of the invention surprisingly makes it possible to achieve an increase in the resistance to chain degradation. Since the same result is achieved by means of the method described in a parallel application (P 39 29 648.2-44) by grafting onto N-halogen polymers, from which it is known that the grafting takes place on the nitrogen, it is assumed that the same also applies to the process of the invention, so that the hydrogen atoms on the nitrogen are substituted entirely or partially by the grafted-on polymer chain. The N-substituted derivatives of the base polymer produced thus represent totally new classes of polymers in the case of polyamides and urethanes since they no longer exhibit the typical peptide or carbamic acid group but rather secondary amide groups or N-substituted carbamic acid groups in the main chain. As a consequence of the lack of a hydrogen atom on the nitrogen and/or of the steric hindrance brought about by the substitution and of the associated, reduced reactivity of these groups, the susceptibility to hydrolysis and oxidation typical for the initial polymers as well as the sensitivity to radiation are decisively reduced.

Oxidation Resistance

The sensitivity to oxidation of the base polymers had the result that according to the state of the art a stabilization takes place by means of an addition of antioxidants if the formed bodies produced therefrom are intended for use at rather high temperatures in the presence of atmospheric oxygen. However, it can be necessary even in such instances in which the use of the formed bodies at high temperatures plays no part to treat them at high temperatures, e.g. in order to clean or sterilize them.

Sterilization at high temperatures plays a large part in the case of form bodies used in medicine or in the pharmaceutical or related industries. Frequently used sterilization methods are based e.g. on autoclaving or on vapor-blasting with water vapor at up to above 140° C. Whereas the presence of residual atmospheric oxygen generally plays a lesser part during autoclaving, assuming appropriate operation of the autoclave, an exclusion of oxygen during vapor-blasting, especially in the initial phase, can not be assured.

The use of antioxidants has serious disadvantages, even though it is an effective measure for avoiding oxidative degradation. On the one hand the protection achieved with it is only temporary because the antioxidant is consumed by oxidation or can disappear in some other manner from the form body. This occurs in particular during extraction by means of liquid media which are in contact with the form body when it is being used. The removal of the antioxidant from the form body can take place at high temperatures even via the gas phase (evaporation, sublimation) because relatively lower-molecular substances are involved without exception which exhibit a certain vapor pressure.

If the antioxidant is extracted by the medium in contact with the form body, there is not only a diminution or disappearance of the oxidation protection but also a contamination of the medium as a consequence. Substances with a very low water solubility can be involved thereby so that the existence of the extracted antioxidant in the medium can hardly be demonstrated. However, in the branches of industry which are potential candidates for using the formed bodies such as e,g. the pharmaceutical or food industry, non-aqueous media such as e.g. those based on alcohols are also frequently used, It can be demonstrated that form bodies such as e.g. microporous membranes stabilized in a traditional manner by antioxidants exhibit no effective stabilization after treatment with ethanol, which can directly demonstrate the alcohol extractability of these antioxidants.

The contamination of the media with antioxidants, which are usually multiple substituted phenol derivatives, must also be designated as extremely undesirable if direct side effects of these substances which effects are toxic or dangerous in some other manner are unknown.

It is known that even substances with an extremely low water solubility are extracted from polymers by aqueous media if these aqueous media contain components which are capable of emulsification or of some other binding of lipoid-soluble substances. This is especially known in the case of softeners like those used in the processing of various plastics. Typical aqueous media capable of extracting lipoid-soluble substances from polymers are protein solutions such as e.g, serum, blood plasma or solutions of serum proteins like those occurring in the fractionation of blood plasma. These media are frequently filtered for the purpose of sterilization by means of microporous membranes from the mentioned polymers, especially from those of polyamides, and can be contaminated by antioxidants located therein.

In a further special instance involving textile fibers based on polyamides a stabilization with antioxidants is out of the question because the tenside-containing, detergent solutions customary when washing textiles would also result in an extraction of antioxidants, so that their effectiveness would be limited to the time of their first usage or a new treatment with antioxidant would be necessary after each washing procedure. The oxidation sensitivity of textile fibers of polyamides is especially noticeable due to a yellowing at high temperatures.

In the case of microporous membranes the oxidative degradation takes effect as a rapid decline in the mechanical strength. If, for example, non-oxidation-stabilized nylon membranes are autoclaved for 1 hour at 140° C. in the presence of atmospheric oxygen, the strength (measured as bursting strength) drops to nearly zero. On the other hand, membranes grafted in accordance with the invention suffer no measurable loss of strength in the sense of a decline of the bursting strength upon more than one hour of being autoclaved under the named conditions. In distinction to membranes stabilized with antioxidants, this resistance to oxidative degradation remains even if the membrane is extracted prior to being autoclaved with a customary extracting agent for antioxidants such as e.g. ethanol.

Hydrolysis Resistance

E.g. aliphatic and aromatic polyamides do exhibit a relatively high alkali resistance; however, the hydrolysis resistance of these polymers in the acidic range must be described as slight. The hydrolysis resistance of polyurethanes is unsatisfactory both in the acidic and in the alkaline range for many applications. polysulfonamides also exhibit a low hydrolysis resistance both in an acidic and in an alkaline milieu. The hydrolytic attack on the formed bodies can take place both during their intended use when aqueous media with high or low pH's and/or high temperatures can act on them or also during vapor sterilization or autoclaving.

The hydrolytic degradation of form bodies used in the medicinal or pharmaceutical field as well as in related fields is damaging not only on account of the already mentioned reduction of the mechanical strength. There is also a risk of contamination here that hydrolysis products of the polymers such as e.g. hexamethylene diamine and adipic acid can pass into the medium in the case of nylon 6.6 and also of oligomers.

The elevation of hydrolysis resistance by means of the use of the process of the invention is especially significant because other methods are not industrially available for the protection of the base polymers against hydrolytic degradation, corresponding to the antioxidants against oxidative degradation. Since the hydrolysis of form bodies attacks the surface, just as oxidation does, a very extensive protection can be achieved on the surface by grafting.

Radiation Resistance

The same also applies to protection against the attack of ultraviolet radiation. Similar to the situation with the antioxidants, the using of the process of the invention renders the use of UV stabilizers superfluous.

The resistance to gamma radiation is of considerable industrial significance because radiation sterilization is widespread for form bodies used in the medical or pharmaceutical field. It is known that e.g. microporous membranes of polyamides are completely destroyed during radiation sterilization. The elevation of the resistance of not very compact form bodies with a high surface/mass ratio to gamma radiation is solved in accordance with the invention by means of an extensive matrix grafting. It is thus necessary in the case of resistance to gamma radiation, on account of the greater penetration depth of this radiation, to graft a greater amount of the base polymer than is necessary for the elevation of the chemical and UV resistance.

Mechanical Properties

A significant alteration of the mechanical properties of form bodies in accordance with the process of the invention is limited by nature to that group which exhibits a high surface/mass ratio because otherwise an alteration of the mechanical surface properties relative to the bulk properties does not take effect.

Base polymers such as polyamides and polyurethanes are primarily used in industry on account of their special mechanical properties, of which in the first instance the mechanical strength and in the second instance the elasticity are especially exceptional. A basic alteration of the chemical nature of these polymers like that represented by the substitution of the hydrogen atom on the nitrogen has as its consequence a basic alteration of the intermolecular forces as the formation of hydrogen bridges between the polymer chains is prevented, as a result of which as a rule no improvement in the mechanical properties is to be expected.

However, it is surprisingly possible according to the invention to effect a considerable improvement of mechanical properties upon a purposeful selection of the monomers used for grafting. Thus, the grafting of hydroxyethylacrylate onto microporous membranes of nylon 6.6 and nylon 6 can eliminate the tendency of these materials toward brittleness in a completely dry state, thus e.g. after drying at 105° C. in a drying cupboard and a totally flexible material with unimpaired mechanical strength can be obtained. If, on the other hand, hydroxyethylmethacrylate is used instead of hydroxyethylacrylate, on the contrary, an embrittlement is more likely observed at the same degree of grafting.

Wettability, Adsorption Properties and Zeta Potential

The type of surface modification which can be attained is determined in an obvious manner primarily by means of the type of monomer used. Monomer mixtures can also be used if necessary if, as is explained in the description of the industrial embodiment of the process, special measures are taken which assure the reproducibility of the monomer composition over the entire production process.

According to a preferred embodiment of the invention the grafted-on monomers are cross-linked, preferably using bifunctional monomers, which cross-linking takes place with advantage simultaneously with the grafting. Unsaturated diesters of polyalcohols are mentioned as such bifunctional monomers (see monomers).

However, it can be advantageous, depending on the intended use, to leave the grafted-on polymer non-cross-linked, in which case care should be taken that no bifunctional monomers are contained as impurities in the ethylenically unsaturated monomers to be grafted.

As regards the monomer concentration, grafting time and grafting temperature, it should be noted that if a high chain density given a small chain length is required, e.g. as concerns the influencing of wetting properties, adsorption properties and zeta potential, only low monomer concentrations and long grafting times should be used and the lowest possible degrees of grafting and, correspondingly, the lowest possible reduction of flowthrough should be striven for. If it is a question of grafting an initial polymer for the subsequent fixing of ligands (e.g. natural and synthetic ligands for affinity chromatography), larger chain lengths with higher degrees of grafting are to be striven for but not necessarily a high chain density. In this instance a higher monomer concentration is selected and shorter grafting times are made to suffice.

Of the monomers indicated in the listing and suitable for the grafting process of the invention, among which monomers the methacrylic acid derivatives are generally preferred over otherwise comparable acrylic acid derivatives on account of their considerably higher hydrolysis stability, the acrylates and methacrylates of polyalcohols such as e.g. of ethylene, glycol, glycerol, diethylene glycol, octaethylene, glycol and of propylene glycol are suitable both for the hydrophilizing, that is, the raising of the wettability by water and also for the diminution of the protein adsorption. In addition, the named monomers are suitable for producing composite materials provided for the subsequent fixing of affinity ligands by means of reactions on the hydroxyl groups. Such a product is described in a parallel application (P 39 29 648.2-44). Hydroxyethylmethacrylate and glycerol methacrylate are especially preferred for this application.

The grafting of glycidyl methacrylate is preferred for the production of base materials for numerous further reactions which are also described in a parallel application (ion exchangers, chelate exchangers, etc.). In addition, the grafting of glycidyl methacrylate can also take place directly with the goal of producing a reactive surface for the chemical bonding of various substances which can react with epoxide groups such as e.g. proteins. A very easy convenient epoxide activation is thus achieved by the grafting of glycidyl methacrylate (the epoxide activation of adsorber surfaces, e.g. by means of reactions with epichlorohydrin, is a widespread technique in affinity chromatograph.). The grafting of methylacrylamidogylcolate methyl ether can also take place for the same purpose, which also exhibits a high reactivity with amino groups and has a high grafting tendency.

For the production of ion exchangers, preferably membrane ion exchangers, the direct grafting of the ionic monomers is also a possibility, in addition to the grafting of glycidylmethacrylate and the following introduction of ionic groups; however, the firsts-named path is more to be preferred than the latter. The strongly acidic, weakly acidic, strongly basic and weakly basic monomers cited in the list of monomers are suitable for these embodiments of the invention. If the already mentioned measures for obtaining a low degree of grafting with a high chain density are used instead of a high degree of grafting necessary for ion exchangers, the mentioned products can be obtained with modified zeeta potential. In this connection, the requirement for a low degree of grafting is primarily significant in the case of microporous membranes in order to avoid an unnecessary reduction of flowthrough.

Degree of Grafting

The term "degree of grafting" denotes the increase in mass of the polymer when using the grafting process of the invention relative to the initial mass of the form body, expressed in % by weight. It is obviously understood that a relevant magnitude can be involved only when grafting powders, granular materials or non-compact form bodies, because in the case of compact form bodies generally only the surface can be grafted.

On the other hand, in the case of non-compact form bodies, among which the microporous membranes constitute an extreme borderline case, the degree of grafting can vary within very broad limits according to the process of the invention. In distinction to the grafting process described in the parallel application (P 39 29 648.2-44), no upper limit can be set for the attainable degree of grafting. This is explained by the fact that a prechlorination, which is exhausted during the grafting, does not have to be carried out, as it does in the cited method. Thus, degrees of grafting of 20,000% can be attained e.g. during the grafting of hydroxyethylmethacrylate onto nylon 6.6 membranes within 24 hours. Products can therefore be obtained which consist of only 0.5% any more of the initial polymer. In the case of form bodies, their form remains preserved and only the dimensions are changed thereby.

The degrees of grafting striven for in practice depend on the desired effect. Depending on whether only pure surface properties, the adsorptive binding capacity or the bulk properties are to be influenced, the ranges of the potential degrees of grafting are, in the indicated order, approximately 1–5%, 5–45% and 10–700%. These ranges are to be understood only as quite rough guidelines.

Tempering

For reasons which have not been physically completely explained at the present time, the grafting behavior of the base polymers is not only dependent on their chemical structure but also on their physical prehistory. This will be explained as follows using the example of polyamides.

Polyamides, for example, appear to occur in various modifications which differ in a conspicuous manner by virtue of their surface properties, especially their wetting behavior. If they are processed out of the melt, as is predominantly the case, they exhibit a high contact angle with water, even if it is still low in comparison to most of the other polymers. On the other hand, if they are precipitated out of solutions at low temperatures, as is the case e.g. in the production of membranes according to the method known as the "phase inversion process", the contact angle with water is so low that spontaneous wetting occurs in the case of microporosity. Such spontaneously wettable products are converted by a tempering procedure near the melting point of crystallite into the same state which is also present in the case of a direct processing from the melt, that is, they can then be wetted just as little as products produced from the melt.

This phenomenon deserves to be mentioned in conjunction with the process of the invention in as far as the form bodies of polyamide 6 and polyamide 6.6 produced by precipitation from solution at low temperatures, which applies e.g. to microporous membranes of this polymer, exhibit a lesser and poorly reproducible grafting tendency. A similarly favorable grafting behavior, both as concerns the grafting capacity as well as the reproducibility, can not be obtained, as is the case of products obtained directly from the melt, until after a tempering step which is carried out e.g. in superheated water vapor at temperatures between 220° and 240° C. The cited tempering step is therefore a preferred if not obligatory partial step when using the process of the invention on microporous membranes of polyamides produced according to the phase inversion process at low temperatures.

Technical Execution of the Process

The grafting of powders and granular materials requires no special explanation since it results for the expert in the art from the following comments in conjunction with formed bodies. Such graftings can be carried out e.g. in agitated containers in a batch operation.

The industrial execution of the process of the invention is explained in detail in the following for the case of areal web materials, especially microporous membranes, fleeces or tissues. The conclusions which result therefrom for the more compact form bodies are not difficult for an expert to derive.

The grafting can take place in a batch operation or in a continuous manner. In order to achieve reproducible results over the entire web length, it is essential that identical conditions be maintained thereby, the consistency of which conditions is subject to various requirements in the course of time during the batch operation and the continuous process.

A device known in the textile industry under the designation "jigger" or a similar apparatus can be used for the batch operation. A Jigger consists of two winding bobbins and a bath located between them. The web material is wound alternatively on the two bobbins and drawn through the bath thereby. The entire device can be hermetically closed by a cover hood.

Since the winding speed can be selected to be very high, identical conditions are also given for the start and the end of the web when the bath changes in its composition during the course of treatment. Although such a changing is not to be striven for, it can be better tolerated than if a continuous method is used.

This is especially significant if a mixture of monomers is grafted. As a consequence of the different copolymerizate parameters of the individual monomers, the grafting bath changes not only in the absolute concentration of monomers but also in their relationship to each other. Therefore, the grafting conditions vary in time during discontinous grafting but in approximately the same manner over the entire web so that the reproducibility is assured.

During the grafting on the jigger, which takes place during a back-and-forth washing of the web through the grafting bath: the redox potential is maintained constant by dosing in the reducing-agent concentrate, which is preferably a 2% solution of Na dithionite. Likewise, the pH is maintained constant by means of dosing lye in as far as it is not preferred to perform an appropriately strong buffering of the bath which would render this superfluous. The presence of the carbon tetrachloride in solution is assured in the most simple manner thereby in that an excess of carbon tetrachloride is located at the bottom of the pan so that approximately the saturation concentration is maintained in the grafting bath, After the grafting time determined in pretests for the attainment of the desired effect, the remaining grafting bath is removed from the jigger, and a soaking performed with an ample supplying of fresh water. The web can then be dried in a known manner or immediately processed further.

Both the bath method or the impregnation method are possible as continuous method. In the case of the bath method, the web is guided for the required grafting time once through the grafting bath and in the case of the impregnation method it is loaded with the impregnating solution and afterwards guided for the required grafting time through a dwell stretch constituting an inert gas chamber. A soaking bath takes place in both instance. The uniformity over the web length presents certain difficulties in the first instance because the reproducibility is only given if the grafting conditions and therewith the composition of the grafting bath are maintained constant for the entire grafting time. Difficulties are posed thereby in particular by maintaining the monomer concentration constant whereas redox potential and pH, as already explained, can be maintained constant. Likewise, the saturation with carbon tetrachloride can also be maintained in a simple manner. One of the methods sketched further below can be considered for supplying the carbon tetrachloride (impregnation with carbon tetrachloride and drying or charging via the gas phase, both before entry of the material web into the grafting bath). The concentration of ethylenically unsaturated monomers can be determined via the UV absorption with sufficient exactitude; however, this method is eliminated in the presence of Na dithionite and carbon tetrachloride because both of them strongly absorb in the same wavelength range. The density measurement is likewise unreliable because the density of the grafting bath varies already by the necessary subsequent addition of electrolytes such as dithionite and lye.

Nevertheless, the bath method can be readily used in certain instances, to wit, when the monomer exhibits a limited water solubility. It is possible in this instance, at least in the range of the saturation concentration, to maintain a constant monomer concentration even for long grafting times. This process variant can also be used in the case of water-miscible monomers such as e.g. hydroxyethylmethacrylate if the monomer solubility is reduced by means of a high addition of neutral salt, e.g. sodium sulfate, so that grafting can be carried out in the saturation range with a constant concentration.

A few monomers which are especially suitable for the process of the invention such as e.g. glycidylmethacrylate, vinyl acetate and methylmethacrylate exhibit a water solubility which is within the range suitable for the use of the process. Thus, the water solubility of vinyl acetate is approximately 1.5%, that of glycidylmethacrylate approximately 2.5%. It is possible in these instances in a relatively easy manner to maintain the grafting bath continuously at the constant concentration corresponding to the saturation, e.g. in that it is saturated with the monomer in a circulating circuit by means of an absorption column. Another, even simpler method consists in that an emulsion of the monomer is used while employing a suitable emulsifier. The monomer represents the disperse phase in such an emulsion whereas the continuous aqueous phase forms the grafting medium. It is easy to recognize even visually in such a process from a decrease of the milky appearance whether the grafting medium has become depleted in monomer so that a subsequent dosing of the emulsion can take place in a timely manner. It is assured in any case that the monomer concentration in the grafting medium does not drop unnoticed below the saturation.

An especially preferred embodiment of the invention is impregnation grafting, in which the material web is impregnated with the grafting bath containing the monomer or monomer mixture either in dissolved form or emulsified form and is subsequently guided through a dwell stretch in inert gas. It must be considered thereby that neither monomer concentration, redox potential nor pH can be maintained constant in time. Inversely, however, the chronological course of these magnitudes can be maintained constant over the entire web length with high reproducibility and a very high degree of constancy of product properties can thus be assured, even if more than one monomer is used.

The supplying of the carbon tetrachloride necessary for the grafting can take place during the impregnation grafting either by means of an addition to the grafting bath, which is less preferred, however, because there is a danger of homopolymerization thereby, or the material web can also be charged with carbon tetrachloride before impregnation with the grafting bath, e.g. by means of wetting either with pure carbon tetrachloride or in a mixture with another volatile solvent such as e.g. acetone and subsequent drying. However, this process is less preferable on account of the toxicity of carbon tetrachloride and the safety measures which are therefore necessary during evaporation.

It was surprisingly determined that a material web consisting of e.g. a polyamide is capable of adbsorbing sufficient amounts of carbon tetrachloride from the gas phase. This can take place either before or after the impregnation with the grafting bath. If the charging with carbon tetrachloride takes place before the impregnation with the grafting bath, the material web is first guided through a gas chamber consisting preferably of nitrogen with a certain partial pressure of carbon tetrachloride. The partial pressue of the solvent is by the liquid carbon tetrachloride located at the bottom of the gas chamber, which is maintained at a certain temperature between 0° C. and the boiling point, preferably between room temperature and 50° C. The dwell time of the web in this gas chamber is between 10 sec. and 10 min., preferably between 1 and 2 min. The stretch between the gas chamber and the impregnating device is maintained as short as possible and the time between the charging with carbon tetrachloride and the impregnation is preferably under 5 sec.

If the charging with carbon tetrachloride takes place after the impregnation with the grafting bath, a certain partial pressure of carbon tetrachloride is maintained in the inert gas stretch after the impregnation in the manner already described, at which time it is preferable if a saturation takes place at room temperature.

Of these two process variants, in general the first-named one, that is, the sorption of carbon tetrachloride from the gas phase before the impregnation with the grafting bath is preferred. On the other hand, the last-named one is to be preferred if extremely long grafting times of over 20 min. are to be used in order to achieve extremely high degress of grafting.

The following examples will explain the invention.

EXAMPLE 1

The grafting took place on non-reinforced, microporous membranes of nylon 6.6 with a nominal pore size of 0.2 µm from a 10% solution of hydroxyethylmethacrylate in 0.1M phosphate buffer (pH 8) in the presence of 1% carbon tetrachloride with the main amount of the carbon tetrachloride lying undissolved on the bottom of the agitated reaction vessel at room temperature. The redox potential was maintained constant at −310 and at −440 mV in each of two test series by continuously dosing in sodium dithionite solution. The grafting time was varied.

Figure 1:
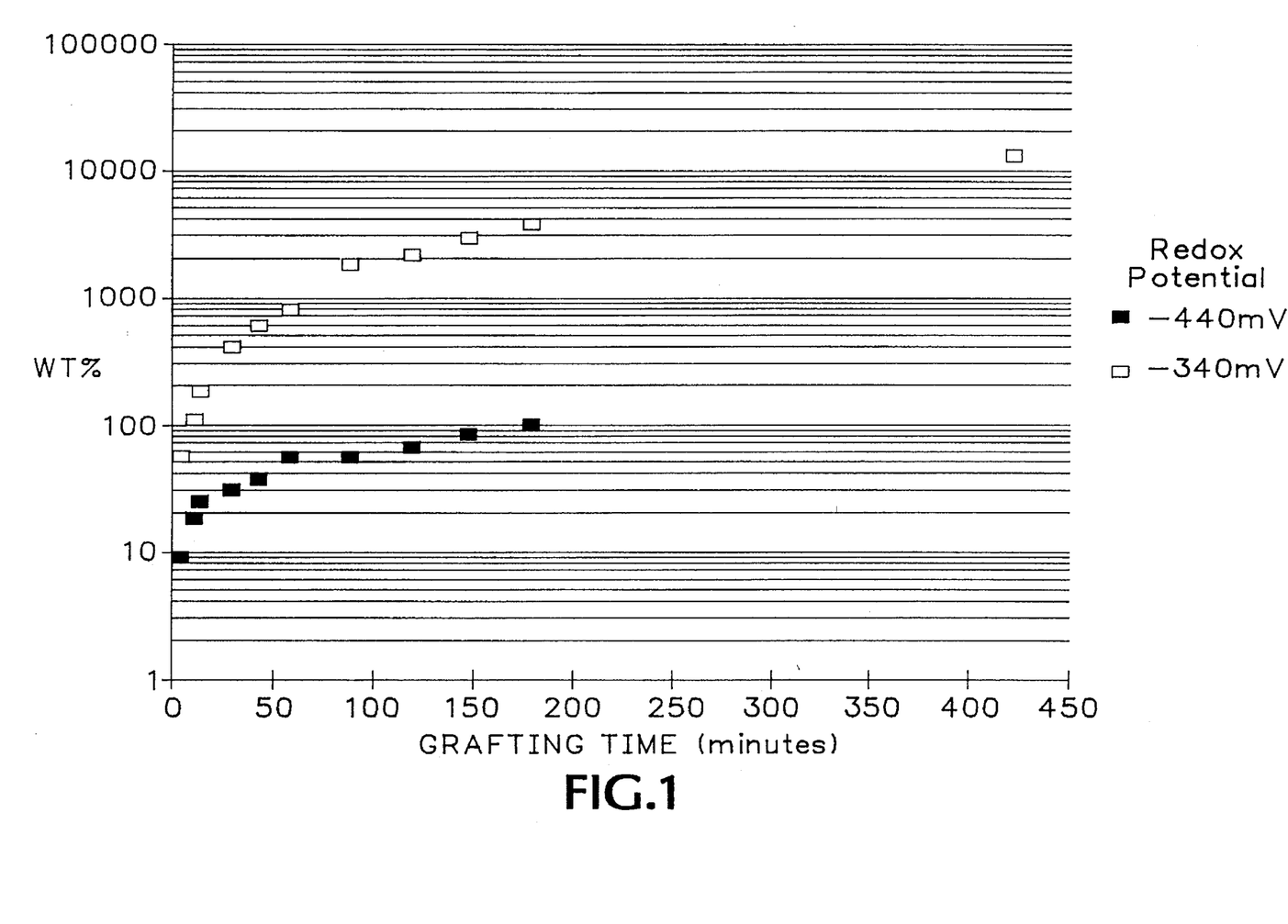
FIG. 1 is a graph showing degree of grafting achieved by the process of the present invention over time.

FIG. 1 shows the course of grafting over time. A logarithmic scale division was selected for the degree of grafting in order to be able to reproduce the extremely rapid course of the grafting at the low redox potential.

Figure 2:
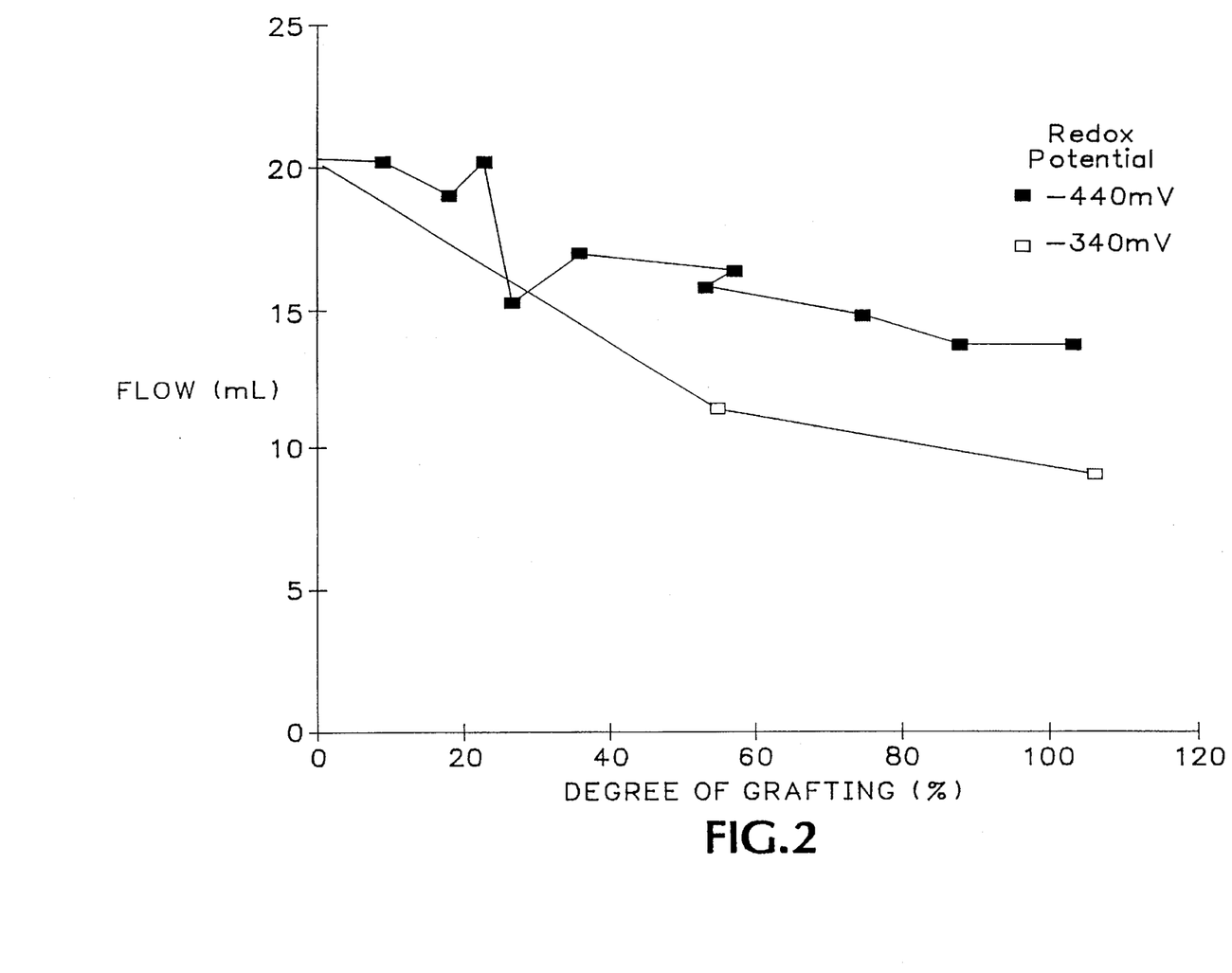
FIG. 2 is a graph showing flow-through rates on grafted microporous membranes as a function of degree of grafting.
Figure 3:
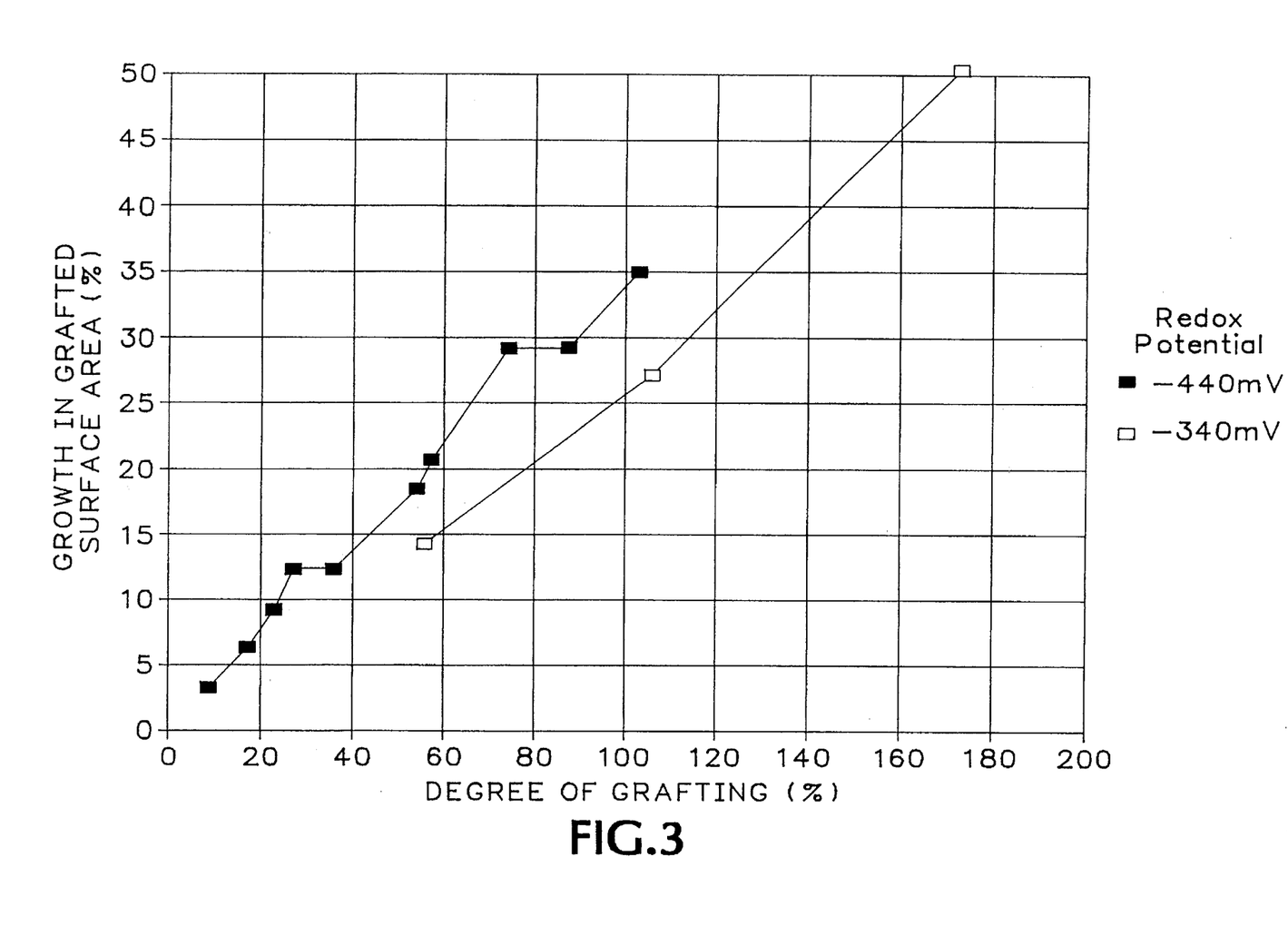
FIG. 3 is a graph showing the growth of grafted surface area in microporous membranes as a function of the degree of grafting.

FIGS. 2 and 3 show flowthrough rates and growth in grafted surface area (in a water-moistened state) of the grafted membranes as a function of the degree of grafting. It can be seen from the two diagrams that the values in the case of the lower redox potential present the reference points for preferred surface grafting discussed above and that at the same degree of grafting the growth in grafted surface area is lower and reduction of flowthrough in relation to the initial membrane higher.

EXAMPLE 2 (reference example)

Three tests were carried out as described in example 1 at a redox potential of −340 mV over a period of 30 min. but in one instance without the addition of carbon tetrachloride, in the second, instance with chloroform and in the third test with methylene chloride instead of carbon tetrachloride. A grafting could not be determined gravimetrically in any instance (in relation to a degree of grafting of approximately 300% in the presence of carbon tetrachloride).

The test shows that grafting constitutes an obligatory component of the process (a slight degree of grafting had been determined in an earlier test with less pure chloroform, which, however, was obviously due to impurities by carbon tetrachloride present in traces.

EXAMPLE 3 (reference example)

A test was carried out as described in example 1 for a period of 30 min.; however, no Na dithionite was added but rather the work was carried out solely under the exclusion of oxygen (boiling off of the buffer, pure nitrogen passed through the monomer solution for two hours before the grafting, nitrogen atmosphere over the grafting bath). No grafting at all was determined.

The test shows that Na dithionite is an obligatory component of the process and that, as already explained, other reducing agents can be considered.

EXAMPLE 4

Various monomers were grafted on a laboratory scale in a grafting bath consisting of 0.1% Na dithionite in 0.15M phosphate buffer pH 8, 10% monomer (in as far as nothing else indicated), pH adjusted to 8 as needed onto nylon 6.6 membranes with a nominal pore size of 0.2 μm, 1% carbon tetrachloride was present as bottom sediment.

| Monomer | degree of grafting (%) after 10 min. | degree of grafting (%) after 30 min. |
|---|---|---|
| diethyleneglycolmethacrylate | 129.0 | 460.0 |
| hydroxypropylmethacrylate | 90.0 | 404.0 |
| hydroxyethylmethacrylate | 104.0 | 365.0 |
| methacrylamidoglycolate-methylether | 72.0 | 185.0 |
| hydroxyethylacrylate | 52.5 | 122.0 |
| hydroxypropylacrylate | 85.0 | 102.0 |
| glycidylmethacrylate (saturated solution) | 28.5 | 74.0 |
| morpholinoethylmethacrylate | 49.3 | 65.0 |
| glycerol methacrylate | 37.3 | 60.7 |
| acrylamide | 26.2 | 57.5 |
| vinyl acetate (saturated solution) | 15.0 | 44.0 |
| octaethylene glycol methacrylate | 10.8 | 35.0 |
| sulfopropylmethacrylate | 1.1 | 13.4 |
| tris-(hydroxymethyl)-methacrylamide | 9.5 | 22.3 |
| trimethylammonium-2-hydroxypropyl-methacrylate-chloride | 6.9 | 17.8 |
| N-morpholinopropyl-methacrylamide | 6.6 | 7.7 |
| acrylic acid | 2.6 | 5.9 |
| dimethylaminoethyl-methacrylate | 0.9 | 5.9 |
| vinyl pyrrolidone | 3.6 | 5.6 |
| methacrylamide | 2.8 | 3.9 |
| 2-acrylamido-2-methyl-propane sulfonic acid | 1.1 | 3.7 |
| vinyl imidazol | 1.7 | 2.1 |

EXAMPLE 5

Jigger grafting of hydroxyethylmethacrylate onto nylon 6.6 membranes (the mode of operation of a jigger is explained in the text).

A membrane web 50 m long (nominal pore diameter of 0.45 μm) was introduced into the dry jigger, the jigger closed and the gas chamber intensively washed with nitrogen for 60 min. while the membrane web was drawn back and forth in the gas chamber.

Grafting bath: 5% hydroxyethylmethacrylate in 0.1M Na phosphate buffer pH 8 was saturated by means of agitation with 1% carbon tetrachloride and compounded immediately before use with 0.1% sodium dithionite.

The grafting bath was filled into the jigger and the latter put into operation, that is, the membrane web was drawn back and forth in the closed jigger between the two winding rollers (web speed 8 m/min.). The grafting bath was controlled during the grafting via an external closed circuit with measuring and control circuits for pH and redox potential and the pH was maintained at the theoretical value of pH 8 by dosing in 10% sodium hydroxide solution and the redox potential at the theoretical value −340 mV by dosing 5% sodium dithionite.

After a grafting time of 30 min., the grafting bath was let out and the membrane web washed with RO water in the jigger, which continued to run. Then the web was dried in a traditional manner on a drum drier at 80° C.

The degree of grafting of the web was ascertained by determining the basic weight at 32±2%. Grafted membranes produced in this manner are suitable as initial material for the production of affinity membranes by binding ligands determined in a known manner such as e.g. reaction dyes to the hydroxyl groups of the graft polymer.

EXAMPLE 6

Investigation of the odixation resistance

Various membrane specimens with a nominal pore size of 0.2 μm are deposited in the gas chamber of an autoclave under a technique customarily used for sterilization. The autoclave was heated to 142° C. but the air was not removed, as is otherwise customary, by blowing off vapor. This assured the simultaneous action of water vapor and atmospheric oxygen at 142° C. After 1 hour the membranes were removed and the bursting limit tested. The measurement of bursting strength took place in such a manner that the wetted filters were loaded without support on a diameter of 25 mm with an increasing gas pressure and the pressure at which the bursting of the membranes occurred was determined. All membrane specimens were non-reinforced. If a bursting strength was measurable, the treatment was multiply repeated. The result shows that the nylon membranes of the market contains extractable antioxidant and that the grafted membrane exhibits the same oxidation resistance as the one stabilized with antioxidant.

| Specimen | Number of autoclavings | Bursting strength (bars) |
|---|---|---|
| Nylon 6.6 non-grafted | 0 | 0.30 |
|  | 1 | 0.0 |
| Ultipor (Pall) | 0 | 0.24 |
|  | 2 | 0.25 |
|  | 4 | 0.26 |
| Ultipor (Pall), extracted overnight with ethanol | 0 | 0.24 |
|  | 1 | 0.0 |
| Nylon 6.6 grafted with hydroxyethyl-methacrylate from test 5 | 0 | 0.45 |
|  | 2 | 0.49 |
|  | 4 | 0.42 |
|  | 5 | 0.43 |
| Nylon 6 grafted in analogy with example 4 for 10 min. with glycidylmethacrylate (degree of grafting 10%) | 0 | 0.35 |
|  | 2 | 0.44 |
|  | 1 | 0.36 |

EXAMPLE 7

Jigger grafting of hydroxyethylmethacrylate onto nylon 6.6 membranes for producing a base material for affinity chromatography The grafting conditions correspond, in as far as there are no indications to the contrary, to those of example 5. The flowthrough capacity of the initial membrane was 37–43 ml/cm$^2$.min.bar. Various degrees of grafting were obtained by using differing monomer concentrations and differing grafting times. Since the engineering tests were carried out with differing membrane charges, the range of variation of the initial membranes (flowthrough capacity, thickness) was relatively large. The degrees of grafting obtained as well as the flowthrough capacities of the grafted membranes are therefore less suited for a strict documentation of the dependency of these magnitudes on the grafting conditions than for showing the general trend.

| Monomer concentration (%) | Grafting time (min.) | Degree of grafting (%) | Flowthrough (ml/cm².min.bar) |
| --- | --- | --- | --- |
| 7.0 | 10 | 15.8 | 24 |
| 7.5 | 10 | 19.6 | 30 |
| 5.0 | 30 | 20.7 | 27 |
| 7.5 | 20 | 26.7 | 31 |
| 7.5 | 25 | 28.7 | 23 |
| 5.0 | 60 | 29.8 | 36 |
| 7.0 | 30 | 33.8 | 24 |
| 7.5 | 30 | 36.1 | 23 |
| 7.5 | 50 | 56.5 | 26 |
| 7.5 | 60 | 58.8 | 18 |

The grafted membranes obtained according to this example were used subsequently for further modification by means of the chemical fixing of a dye ligand (reactive blue 2). The dye fixing also took place in the jigger using a dye bath consisting of 5% cibacron-blue F2GA (Ciba-Geigy), 10% urea, 0.3% ludigol (BASF) and 2.18% sodium hydroxide. The exposure time was 20 hours and the reaction temperature 23° C.

The affinity membrane obtained by the fixing of the dye ligand forms the subject matter of a parallel application. Other synthetic and natural ligands can also be fixed to membranes grafted with monomers containing hydroxyl groups. The grafted membrane is to be considered as just as universally applicable a carrier for the ligands as e.g. agarose beads are in traditional affinity chromatography. The chemical methods of the fixing are generally known from the literature and are to be found e.g. in M. Wilchek, T. Miron and J. Kohn, "Affinity Chromatography" in "Methods of Enzymology" 104, pp. 3–55 (1984). It will be explained, using the example of dye ligands, by what method the optimization of the carrier material can take place using the grafting method of the invention so that an expert in the art is able to carry out such an optimization even when using other affinity ligands or when grafting other monomers containing hydroxyl groups.

FIG. 4 shows the bonding capacity for lactate dehydrogenase (LDH) and the flowthrough capacity of the affinity membrane obtained as a function of the degree of grafting. It turns out that a certain minimum degree of grafting, which is approximately 20% in the pore size range selected, is necessary for assuring a high binding capacity and that the rise of binding capacity is accompanied by a reduction of the flowthrough capacity. The flowthrough capacity is sharply reduced by the fixing of the dye ligand to the grafted membrane.

EXAMPLE 8

Wettability of hydroxyethylmethacrylate-grafted membranes by liquids with a high surface tension.

The time which elapses between the adding of 10 μl water ($\gamma$=72 dyn/cm) or solution of common salt onto the membrane surface and the complete adsorption of the liquid by the membrane (suction time) was determined on membranes grafted according to example 7. A 17% ($\gamma$=79 dyn/cm) solution of common salt and a saturated solution of common salt (26%, $\gamma$=82.6 dyn/cm) were used. The non-grafted, membranes and commercially available nylon 6.6 membranes were used for comparison. The commercial product "Loprodyne" is a product which is surface-modified in order to raise the hydrophilicity. In the table the suction times are indicated in seconds.

| Specimen | Water | 17% NaCl | 26% NaCl |
| --- | --- | --- | --- |
| Non-grafted | 33 | >3600 | no wetting |
| Degree of grafting 20% | 17 | 70 | 220 |
| Ultipor 0.2μ (Pall) | 21 | >3600 | no wetting |
| Loprodyne 0.2μ (Pall) | 20 | 210 | no wetting |

The wettability necessary for a special application can be adjusted within broad limits in the grafting process of the invention and all hydrophilic monomers can be used thereby. It is not necessary thereby that the monomer comprises hydroxyl groups. The ionic monomers can also be considered as well as neutral ones such as e.g. vinyl pyrrolidone. Glycidylmethacrylate, which does not bring about any hydrophilizing itself, can also be grafted for hydrophilic modification and subsequently hydrolysed to glycerol methacrylate. The same applies to the grafting of vinyl acetate and the subsequent saponification to vinyl alcohol.

EXAMPLE 9

Protein adsorption of nylon 6.6 membranes (nominal pore size 0.2 μ) grafted with various monomers Various monomers were grafted in analogy with example 4 (10% monomer, 0.1% Na dithionite, 0.15M phosphate buffer pH 8, 1% carbon tetrachloride, grafting time 10 min., room temperature) and the adsorption of γ-globulin subsequently determined, The determination was performed as follows: A membrane specimen 25 mm in diameter was agitated 3 hours at room temperature in 5 ml of a 1% solution of bovine gamma-globulin in 50 mM phosphate buffer pH 7 and subsequently agitated 5 times or 5 minutes per time in a constantly renewed protein-free buffer solution pit 7. The specimen was then agitated 30 minutes in 2 ml BCA reagent (Pierce) with an addition of 0.1% Triton X. After measurement of the extinction at 562 nm, the protein concentration was determined from a corresponding straight line equation and the adsorbed amount of protein calculated in μg/cm².

| Monomer | Degree of grafting (%) | Flow-through (ml/cm².min.bar) | Protein adsorption (μg/cm²) |
| --- | --- | --- | --- |
| Non-grafted | 0 | 16 | 183.5 |
| Diethyleneglycol-methacrylate | 149.4 | NA | 49.8 |
| Acrylamide | 24.4 | 9.7 | 97.9 |
| Hydroxypropyl-methacrylate | 94.3 | 8.9 | 50.1 |
| Hydroxypropyl-acrylate | 83.4 | 9.7 | 3.0 |
| Hydroxyethyl-acrylate | 53.8 | NA | 20.4 |
| Morpholinoethyl-methacrylate | 49.6 | 13.0 | 11.7 |
| Hydroxyethyl-methacrylate | 25.0 | 14.0 | 19.5 |

It is apparent from this data, which was obtained from products which were not further optimized, that not only monomers containing hydroxyl groups but also those free of hydroxyl groups such as e.g. morpholinoethylmethacrylate can be used with good results for lowering the protein adsorption.

EXAMPLE 10

Continuous grafting of glycidylmethacrylate by means of impregnating with the grafting solution Initial membrane: Web material of a nylon 6 membrane with a nominal pore size of 0.45 μ.

The grafting took place on an apparatus which permits the guiding of the membrane web successively through two sealed gas chambers and then through a soaking pan. The web speed and the dwell stretches were coordinated in such a manner with one another that the dwell time in the first gas chamber was 2 minutes and in the second chamber 10 minutes. The necessary dwell stretches were achieved via deflection rollers in order to keep the total volume of the apparatus small. The dwell time in the soaking pan, through which RO water flowed, was also 10 minutes.

An air jet was located at the entrance of the second gas chamber in direct contact with the membrane web through which the grafting solution was supplied from the outside. The first gas chamber was filled with nitrogen saturated with carbon tetrachloride. This was achieved in that the bottom of this chamber was covered to a height of a few millimeters with carbon tetrachloride which was maintained at 35° C. by a heating coil.

The bottom of the second gas chamber was covered with a solution of 3% sodium sulfite and 1% sodium dithionite at a pH of 7 in order to assure absolute freedom from oxygen. The effectiveness of this measure was supported by the fact that the walls of this gas chamber were covered with filtering paper which dipped into the liquid and drew it up by capillary action. The gas chamber was intensively flushed with 99.999% nitrogen before the start of the test and on the other hand a gentle current of nitrogen was maintained during the test.

Although the grafting can also be carried out with less complicated measures, it is essential that even traces of oxygen are excluded if a very high degree of grafting yield is to be assured. The term "grafting yield" denotes in this connection that portion of the supplied monomer which is bonded during the grafting. It amounts to practically 100%, given careful execution of the described measures and sufficient dwell time of the material web in the second gas changer, which is significant not only for an economical use of the monomer but also as regards existing law (environmental contamination by monomers in the wash water).

The supply of the grafting solution was adjusted to the degree which resulted in a complete saturation of the membrane web. A continuous grafting resulted under these conditions in an approximately 100% grafting yield if a saturated solution of glycidylmethacrylate was carried out either in a 0.1% solution of sodium dithionite, in 0.1M phosphate buffer pH 7, a 10% emulsion of glycidylmethacrylate or in a 10% solution of glyciylmethacrylate in a mixture of 30% acetone and 0.1% sodium dithionite 0.1M phosphate buffer pH 7 as grafting solution. 0.2% of an emulsifier (Ariatone G, ICI) was used to produce the glycidylmethacrylate emulsion.

The degree of grafting was 5.4% in the case of the aqueous glycidylmethacrylate solution (solubility of the monomer in water: 2.5%), in the case of the emulsion 20.8% and in the case of the acetone buffer system 19.9%. If a liquid adsorption of the material web of 220% is taken as basis, which was determined in a separate test, a grafting yield of 98% results in the first case, of 94.5% in the second case and of 90.5% in the third case.

We claim:

1. A method of conducting a graft polymerization reaction between the components A and B, wherein component A comprises at least one ethylenically unsaturated monomer and component B comprises a nitrogen-containing polymer selected from the group consisting of polyamides, polysulfonamides, polyurethanes, and polymers having primary or secondary amino groups in a side chain, the method comprising contacting component B with component A in an aqueous environment in the presence of two reactants, said two reactants consisting essentially of (1) carbon tetrachloride and (2) a reducing agent selected from of sodium dithionite, rongalite, hydrazine, and ascorbic acid.

2. The method of claim 1 wherein said carbon tetrachloride is present in an amount equal to at least 1% by weight.

3. The method of claim 1 conducted at a redox potential from −310 to −440 mV.

4. The method of claim 1 conducted at a temperature of from 0° to 50° C.

5. The method of claim 1 conducted in a buffered solution having a pH of from 7.5 to 8.5.

6. The method of claim 1 wherein component A contains at least one hydroxyl group.

7. The method of claim 1 wherein component B is in the form of a web.

8. The method of claim 7 wherein said web is first treated with said carbon tetrachloride.

9. The method of claim 7 wherein said web is treated with said carbon tetrachloride in the gas phase.

10. The method of claim 1 or 7 wherein component A is emulsified.

11. The method of claim 1 or 7 conducted in an atmosphere of nitrogen.

12. The method of claim 1 or 7 wherein component A is vinyl acetate and the acetyl group thereof is hydrolyzed after said graft polymerization reaction.

13. The method of claim 1 or 7 wherein component A is glycidylmethalcrylate and the same is hydrolyzed after said graft polymerization reaction.

14. A filter membrane prepared by the method of claim 1.

15. The product of the method of claims 1 or 7.

16. The product of the method of claim 12.

17. The product of the method of claim 13.

* * * * *

UNITED STATES PATENT AND TRADEMARK OFFICE
CERTIFICATE OF CORRECTION

PATENT NO. : 5,556,708

DATED : September 17, 1996

INVENTOR(S) : Hörl, et al.

It is certified that error appears in the above-identified patent and that said Letters Patent is hereby corrected as shown below:

| | |
|---|---|
| Col. 7, Line 28 | change "1,000,0000" to --1,000,000-- |
| Col. 8, Line 28 | change "procuded" to --produced-- |
| Col. 10, Line 34 | delete [therey] after "be used"<br>insert --thereby-- after "be used" |
| Col. 11, Line 8 | insert --be-- after "is to" and before "extracted" |
| Col. 11, Line 38 | insert --)-- after (1954) |
| Col. 12, Line 16 | delete [chein]<br>insert --chain-- |
| Col. 13, Line 13 | delete [e,g.]<br>insert --e.g.-- |
| Col. 13, Line 16 | delete [,] after "frequently used"<br>insert --.-- after "frequently used" |
| Col. 14, Line 4 | delete [polysulfonamides]<br>insert --Polysulfonamides-- |
| Col. 15, Line 56 | delete [,] after "ethylene" and before "glycol"<br>insert --,-- after "ethylene glycol" |
| Col. 15, Line 56-57 | delete [,] after "octaethylene" |
| Col. 16, Line 10 | change "chromatograph" to --chromatography-- |
| Col. 16, Line 18 | delete [firsts]<br>insert --first-- |
| Col. 16, Line 26 | delete [zeeta]<br>insert --zeta-- |
| Col. 17, Line 59 | delete [Jigger]<br>insert --jigger-- |
| Col. 18, Line 13 | delete [:] after "bath"<br>insert --,-- after "bath" |
| Col. 18, Line 22 | delete [,] after "bath"<br>insert --.-- after "bath" |

UNITED STATES PATENT AND TRADEMARK OFFICE
CERTIFICATE OF CORRECTION

Page 2 of 2

PATENT NO. : 5,556,708

DATED : September 17, 1996

INVENTOR(S) : Hörl, et al.

It is certified that error appears in the above-identified patent and that said Letters Patent is hereby corrected as shown below:

| | |
|---|---|
| Col. 19, Line 48 | change "adbsorbing" to --adsorbing-- |
| Col. 20, Line 9 | delete [degress]<br>insert --degrees-- |
| Col. 22, Line 55 | insert --.-- after "chromatography" |
| Col. 23, Line 6 | insert --.-- after "15" and before "8"<br>(read: 15.8) |
| Col. 23, Line 34 | delete [Will]<br>insert --will-- |
| Col. 23, Line 41 | change "4" to --2-- |
| Col. 23, Line 62 | delete [,] after "non-grafted" |
| Col. 24, Line 27 | insert --.-- after "monomers" |
| Col. 24, Line 27 | delete [μ]<br>insert --μm-- |
| Col. 24, Line 32 | delete [,] after "determined"<br>insert --.-- after "determined" |
| Col. 25, Line 2 | insert --.-- after "solution" |
| Col. 25, Line 6 | delete [μ]<br>insert --μm-- |

Signed and Sealed this

Seventeenth Day of November, 1998

Attest:

BRUCE LEHMAN

*Attesting Officer*    *Commissioner of Patents and Trademarks*